United States Patent
Yu et al.

(10) Patent No.: US 9,067,650 B2
(45) Date of Patent: Jun. 30, 2015

(54) MULTIFUNCTIONAL POWER FLOATING APPARATUS FOR WATER ACTIVITY

(71) Applicant: National Yunlin University of Science and Technology, Yunlin County (TW)

(72) Inventors: Yuan-Liang Yu, Yunlin County (TW);
Wei-Yuan Dzan, Kaohsiung (TW);
Heiu-Jou Shaw, Tainan (TW);
Kuan-Liang Chen, Kaohsiung (TW);
Li-Yen Hou, New Taipei (TW);
Sheng-Chih Shen, Tainan (TW);
Terng-Jou Wan, Yunlin County (TW);
Chi-Chun Chen, Chiayi (TW);
Chung-Yen Chang, Taichung (TW);
Shun-Min Shi, Nantou County (TW)

(73) Assignee: National Yunlin University of Science and Technology, Yunlin County (TW)

( * ) Notice: Subject to any disclaimer, the term of this patent is extended or adjusted under 35 U.S.C. 154(b) by 79 days.

(21) Appl. No.: 13/753,820

(22) Filed: Jan. 30, 2013

(65) Prior Publication Data

US 2014/0030941 A1    Jan. 30, 2014

(30) Foreign Application Priority Data

Jul. 27, 2012   (TW) .............................. 101127241 A

(51) Int. Cl.
*B63B 35/73* (2006.01)
*B63B 35/79* (2006.01)
*B63H 21/17* (2006.01)

(52) U.S. Cl.
CPC .............. *B63B 35/73* (2013.01); *B63B 35/7943* (2013.01); *B63B 2209/18* (2013.01); *B63H 2021/171* (2013.01)

(58) Field of Classification Search
CPC .......... B63B 17/02; B63B 1/12; B63B 35/73; B63B 35/7943; B63B 2209/18; B63H 21/17; B63H 2021/171; B63J 2003/003; Y02T 70/5245; B63C 11/49
USPC .............. 114/61.1–61.25, 258, 259; 441/132; 440/6
See application file for complete search history.

(56) References Cited

U.S. PATENT DOCUMENTS

| | | | | |
|---|---|---|---|---|
| 4,619,863 | A * | 10/1986 | Taylor ........................... | 428/221 |
| 6,209,253 | B1 * | 4/2001 | Saldana, Jr. .................... | 43/21.2 |
| 7,538,511 | B2 * | 5/2009 | Samek .......................... | 318/588 |
| 8,438,985 | B2 * | 5/2013 | Scadden ..................... | 114/61.25 |
| 2013/0174768 | A1 * | 7/2013 | von der Goltz ................. | 114/66 |

* cited by examiner

*Primary Examiner* — S. Joseph Morano
*Assistant Examiner* — Andrew Polay
(74) *Attorney, Agent, or Firm* — Ming Chow; Sinorica, LLC

(57) ABSTRACT

A multifunctional floating apparatus, which is able to float on water, includes a floating device, a handrail, a driving device, a controlling device, and a battery set. The floating device has an exterior edge and an interior edge, wherein the exterior edge is longer than the interior edge, and the floating device has an inner side at the interior edge. The handrail is connected to the inner side of the floating device, wherein the handrail has at least a holding portion for a user to hold the handrail. The driving device is provided on the floating device to drive the floating device to sail on water. The controlling device is electrically connected to the driving device to control the controlling device. The battery set is disposed to the floating device to supply the driving device with electric power.

15 Claims, 13 Drawing Sheets

MULTIFUNCTIONAL POWER FLOATING APPARATUS FOR WATER ACTIVITY

BACKGROUND OF THE INVENTION

1. Field of the Invention

The present invention relates generally to a floating device, and more particularly to a multifunctional power floating apparatus for water activities.

2. Description of the Related Art

The ocean contains many nature resources as well as many unique sights which are distinctive from landscapes, and consequently attracts people spending their leisure time on a variety of marine activities such as snorkeling, diving and fishing. Conventional marine activities like snorkeling, for example, people have to go to the snorkeling location by boat and then jump into water with life vests by themselves. Regarding to the life vest is the only mean can help snorkeling people floating in the middle of the sea, that's hard to find a place to take a rest. For the people who are not good at swimming, even though they can float in the water by life vest, the fear of being in the water still keep them from the joy of freedom and the beauty of the sea. Moreover, not only the fishes may be scared away by the engine sound of the boat but also the exhaust and the slop oil may pollute environment. As the result, the conventional marine activities may not be safe as well as ecologically friendly or become sustainable development.

SUMMARY OF THE INVENTION

The primary objective of the present invention is to provide a multifunctional power floating apparatus, which makes people to enjoy the water activities in a safe way.

The secondary objective of the present invention is to provide a multifunctional power floating apparatus, which may help user to swim without any pollution.

According to the objectives of the present invention, a multifunctional floating apparatus, which is able to float on water, includes a floating device, a handrail, a driving device, a controlling device, and a battery set. The floating device has an exterior edge and an interior edge, wherein the exterior edge is longer than the interior edge, and the floating device has an inner side at the interior edge. The handrail is connected to the inner side of the floating device, wherein the handrail has at least a holding portion for a user to hold the handrail. The driving device is provided on the floating device to drive the floating device to sail on water. The controlling device is electrically connected to the driving device to control the controlling device. The battery set is disposed to the floating device to supply the driving device with electric power.

In an embodiment, the handrail has at least an opening, and the holding portion is formed beside the opening.

In an embodiment, the handrail has a plurality of openings, and the holding portion is formed beside each of the openings.

In an embodiment, the multifunctional floating apparatus further includes at least a solar panel provided on the floating device and electrically connected to the battery set to convert light into electric power, and the electric power is stored in the battery set.

In an embodiment, the multifunctional floating apparatus further includes a power converting module, wherein the driving device and the controlling device are electrically connected to the battery set through the power converting module, and the power converting module converts the electric power of the battery set in to predetermined current and voltage respectively for the driving device and the controlling device.

In an embodiment, the floating device has an up case and a low case connected together, and the solar panel is provided on the up case.

In an embodiment, the multifunctional floating apparatus further includes a cover provided on the up case, wherein the cover is transparent and the solar panel is under the cover.

In an embodiment, the driving device has two motors and two propellers respectively connected to the motors; the propellers are parallel and separated under water; the motors respectively drive the propellers to turn; and the controlling device controls the motors.

In an embodiment, the multifunctional floating apparatus further includes two lids provided on the floating device, wherein the lids respectively surround the propellers.

In an embodiment, the controlling device further has a controller and a navigating module; the navigating module receives a GPS (global position system) signal; and the controller controls the motors respectively according to the GPS signal.

In an embodiment, the controlling device further has a controller and an orientation controlling module; the orientation controlling module is manipulated by a user and the controller controls the motors accordingly.

In an embodiment, the multifunctional floating apparatus further includes a shade, wherein the shade has opposite ends connected to the inner side of the floating device to form a shading area.

In an embodiment, the multifunctional floating apparatus further includes a shade, wherein the shade has opposite ends connected to the handrail to form a shading area.

In an embodiment, the multifunctional floating apparatus further includes a board connected to the floating device.

In an embodiment, the board has a slot and a plurality of bore.

Therefore, user may take water activities with the floating apparatus of the present invention in a safe way. The floating apparatus of the present invention will not generate any pollution to save our planet.

DETAILED DESCRIPTION OF THE INVENTION

Figure 1:
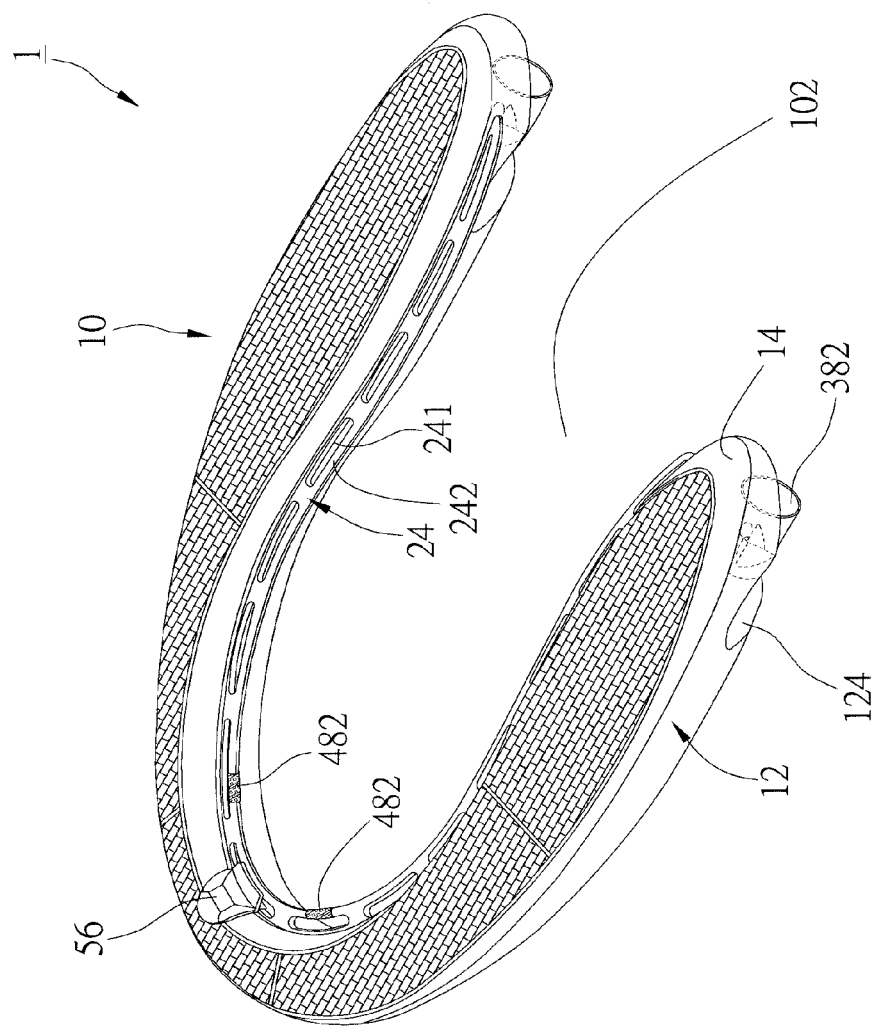
FIG. 1 is a perspective view of a first preferred embodiment of the present invention.
Figure 2:
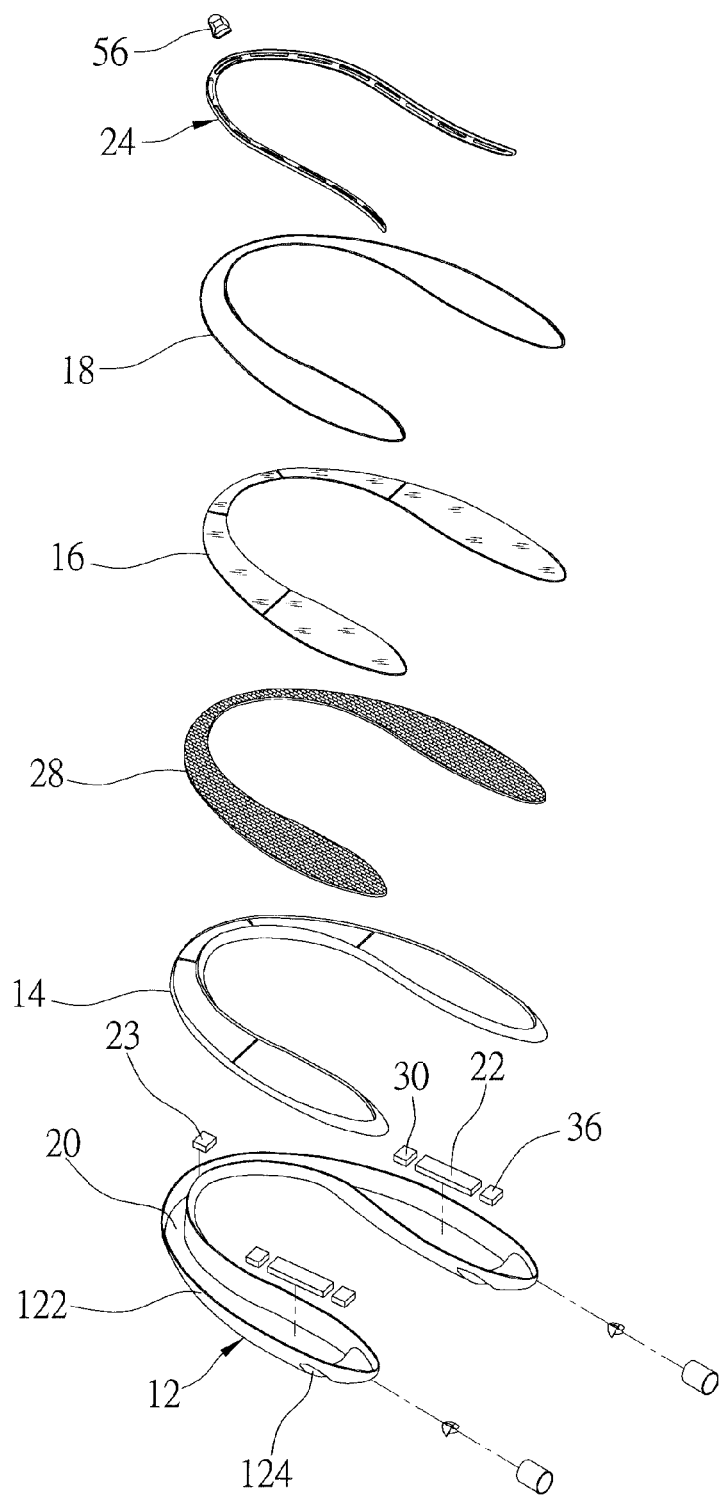
FIG. 2 is an exploded view of the first preferred embodiment of the present invention.
Figure 3:
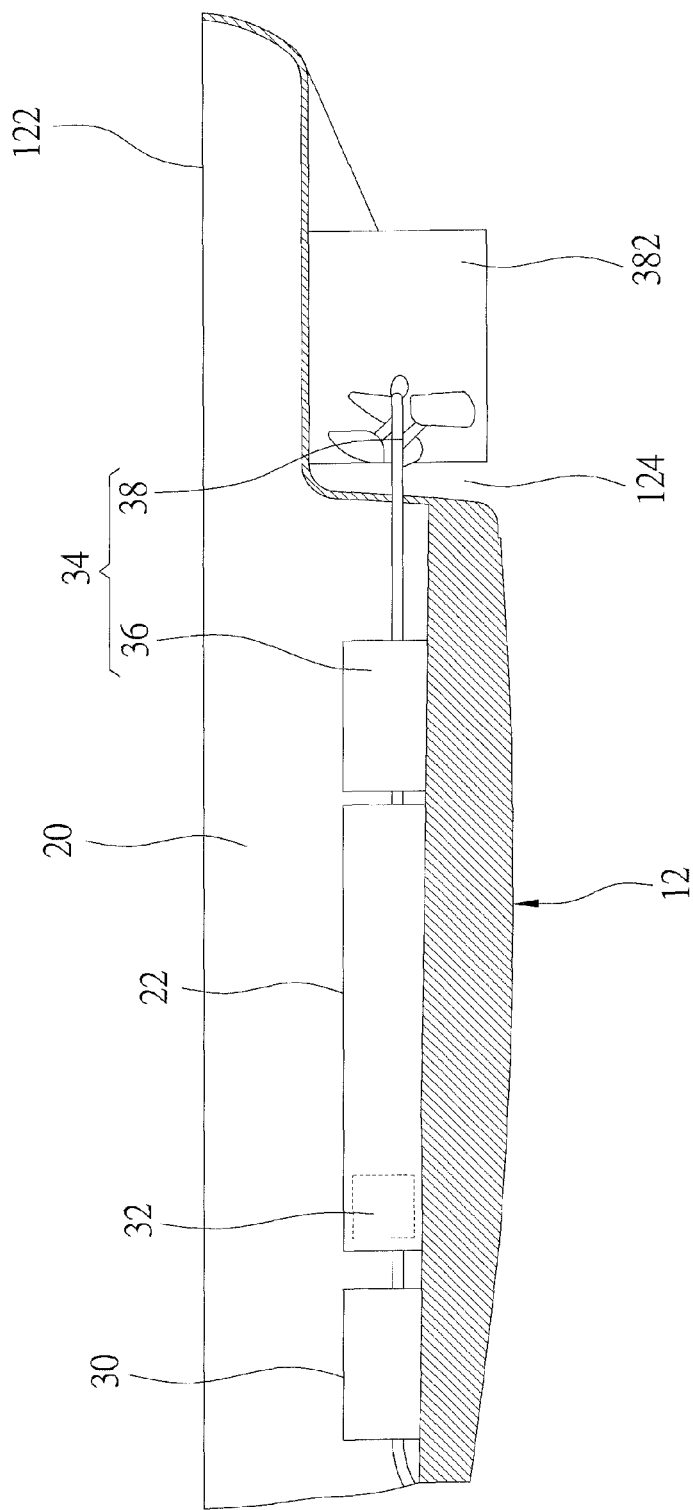
FIG. 3 is a sectional view of the first preferred embodiment of the present invention.

The purpose of the present invention is to provide a new path of a sliding exercise for training. Both feet of a user slide in a substantially horizontal plane. It is preferable that the sliding exercise is taken on a specific training machine, and the training machine has two pedals to move in the new path.

As shown in FIG. 1 to FIG. 4, a multifunctional floating apparatus 1 of the first preferred embodiment of the present invention includes a floating device 10, a handrail 24, a solar power source 26, a driving device 34, and a controlling device 40.

The floating device 10 is a U-shaped member, and therefore it has two tails. The floating device 10 has an exterior edge and an interior edge, and the exterior edge is longer than the interior edge. Therefore, the floating device 10 has an inner side at the interior edge. A protective space 102 is form within the inner side of the floating device 10 for a user to stay so that the floating device 10 may protect user in the water activity. The floating device 10 has a low case 12, an up case 14, and a cover 16. The low case 12 has an opening 133 at a top thereof and two recesses 124 at a bottom thereof and adjacent to the tails. The up case 14 is connected to the low case 12 to seal the opening 133. The cover 16 is made of transparent acrylic and is connected to the up case 14. The floating device 10 further has a sealing member 18, which is a silicon rubber strip in the embodiment, between the low case 12 and the up case 14 so that a watertight chamber 20 is formed between the low case 12 and the up case 14.

The handrail 24 is connected to the inner side of the floating device 10, and more precisely it is connected to the interior edge. The handrail 24 surrounds the protective space 102 to give the user more protection. The handrail 24 has several elongated openings 241 and holding portions 242 beside the openings 241 so that the user may put fingers into the opening 241 and grip the corresponding holding portion 242 to keep him/her in the protective space 102.

The solar power device 26 has a solar panel 28, a battery set 30, and a power converting module 32. The solar panel 28 is under the protective transparent cover 16 to receive light and convert it into electric power. The battery set 30 is received in the chamber 20 and is connected to the solar panel 28 to receive and store the electric power. A box 20 is provided in the chamber 20, in which the power converting module 32 is provided. The driving device 34 and the controlling device 40 are respectively connected to the battery set 30 through the power converting module 32. The driving device 34 converts the electric power of the battery set 30 into predetermined current and voltage respectively for the driving device 34 and the controlling device 40.

The driving device 34 is provided on a bottom of the floating device 10 to drive the floating apparatus 1 to sail. The driving device 34 includes two motors 36, two propellers 38 and two lids 382. The motors 36 are received in the chamber 20 and are provided on an inner side of the low case 12 and adjacent to the tails. The propellers 38 are provided on the floating device 10 outside of the chamber 20, and precisely they are in the recesses 124 and normally they are under the water. The motors 36 are respectively connected to the propellers 38 to drive them to turn. The lids are provided on the floating device 10 and surround the propellers 38 to isolate the propellers 38 from the user.

Figure 4:
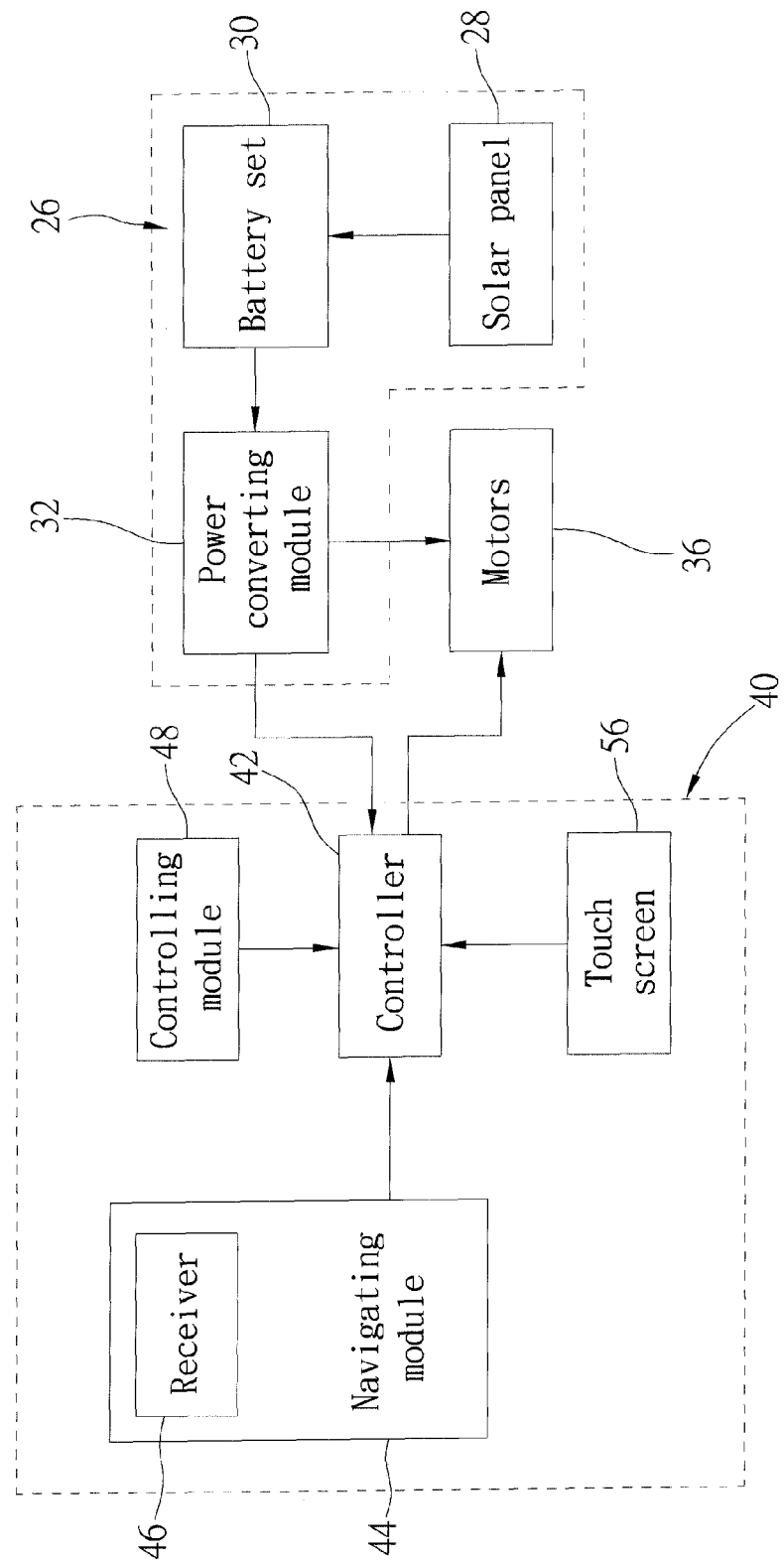
FIG. 4 is a block diagram of the first preferred embodiment of the present invention.

As shown in FIG. 4, the controlling device 40 has a controller 42 electrically connected to the motors 36 to control the motors 36. The controlling device 40 further has a navigating module 44, an orientation controlling module 48, and a touch screen 56. A box 23 is provided in the chamber 20, in which the controller 42 and the navigating module 44 are provided. The navigating module 44 is a global position system. The touch screen 56 is provided on the handrail 24. The orientation controlling module 48 has two handles 482 on the handrail 24 and at opposite sides of the touch screen 56.

The battery set 30 supplies power to the motors 36 and the controller 42 through the power converting module 32. The navigating module 44 has a receiver 46 to receive a GPS signal, and position information is shown on the touch screen 56. The user may input a destination through the touch screen 56, and the controller 42 will control the motors 36 automatically according to the GPS signal for automatic navigation.

The floating apparatus 1 may be switched to manual mode by touching the touching screen 56. In the manual mode the user may operate the handles 482 to drive the floating apparatus 1.

The floating apparatus 1 is provided with a return function. The user has to input a starting position through touching screen 56, and the return function may automatically drive the floating apparatus 1 back to the starting position.

Figure 5:
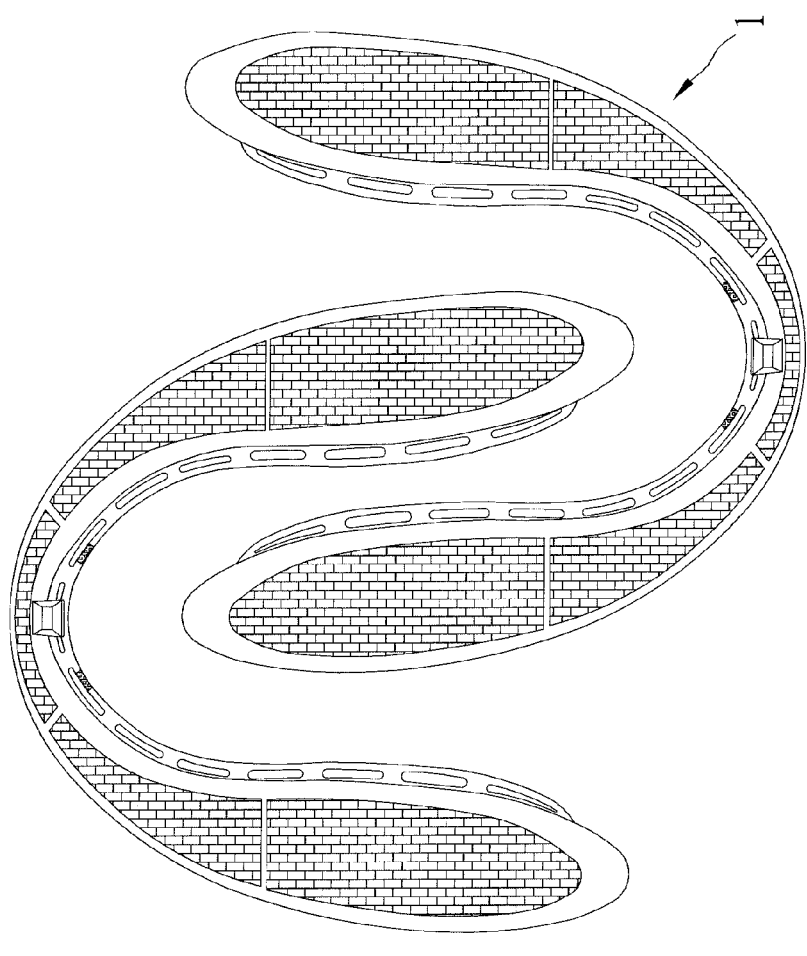
FIG. 5 is a perspective view of the first preferred embodiment of the present invention, showing two floating apparatuses in storage.

As shown in FIG. 5, one may put the tail of the floating device 10 in the protective space 102 of another floating device 10 to reduce the space for storage of the floating apparatuses 1.

The floating apparatus 1 of the present invention uses the solar power which does not generate any pollution in operation of the floating apparatus 1. The protective space 102 of the floating apparatus 1 may help one who cannot swim to play in a safe way. The floating apparatus 1 of the present invention further has several functions, such as navigation function and return function, which help user to move on the water without having to worry about getting lost. The floating apparatus 1 further provides the manual mode to allow the user to enjoy the sailing.

Figure 6:
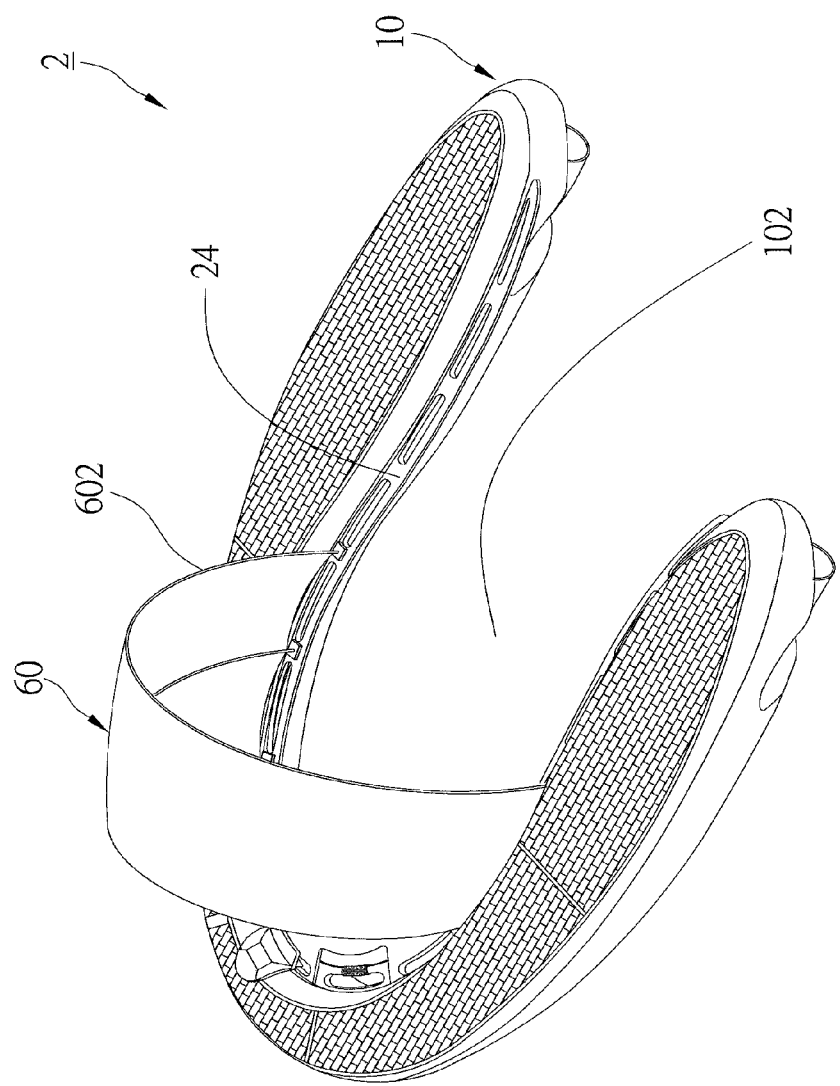
FIG. 6 is a perspective view of a second preferred embodiment of the present invention.

FIG. 6 shows a floating apparatus 2 of the second preferred embodiment of the present invention, which further provides a shade 60. Two flexible poles 602 are fixed to opposite sides of the shade 60, and opposite ends of the poles 602 is connected to the handrail 24. The poles 602 are longer than a width of the protective space 102 so that it will have the arched shade 60 over the protective space 102 to form a shading area. The user may hide under the shade 60 to block sunshine.

Except for the handrail 24 the shade 60 may be connected to any suitable position, such as the inner side of the floating device 10, to provide a sunshade over the protective space 102.

Figure 7:
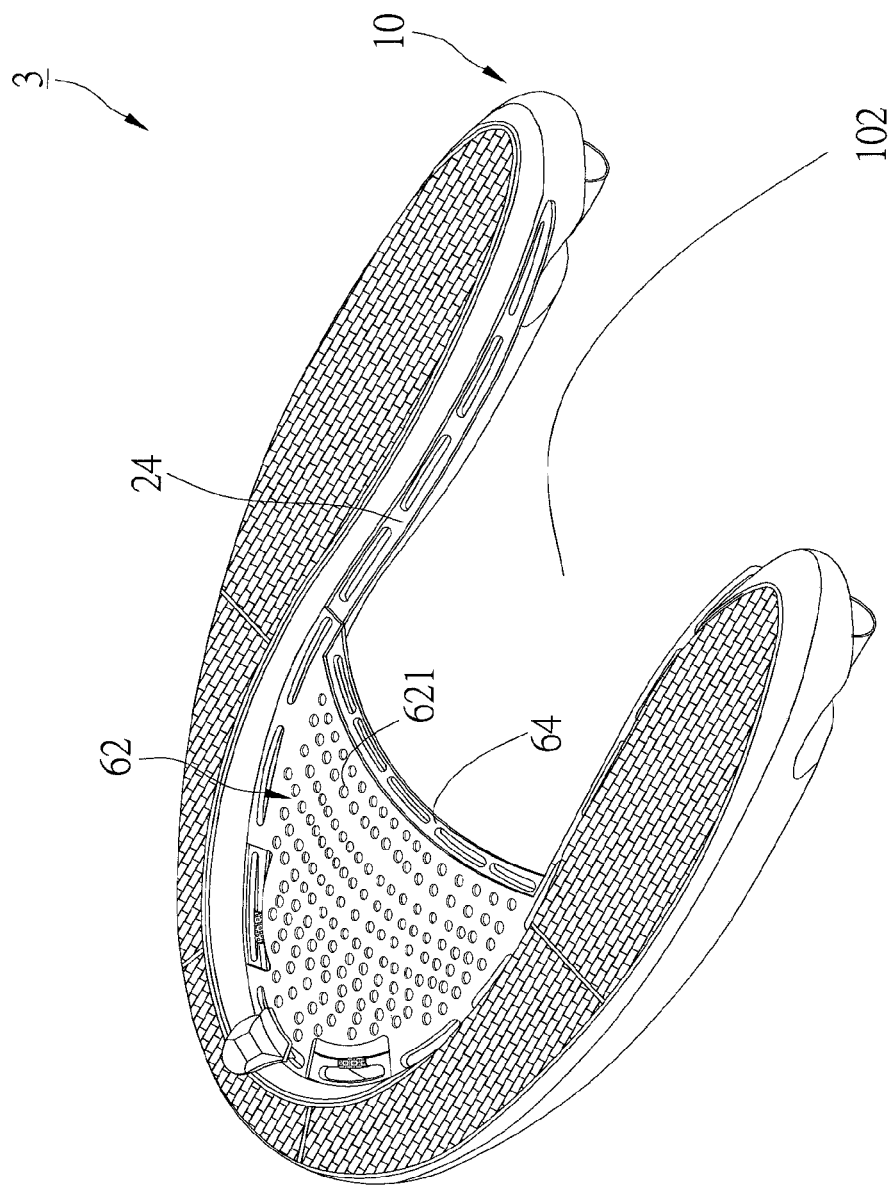
FIG. 7 is a perspective view of a third preferred embodiment of the present invention.

FIG. 7 shows a floating apparatus 3 of the third preferred embodiment of the present invention, which further provides a board 62 for the user to rest. The board 62 is in the protective space 102 and has its edge fixed to the handrail 24. The board 62 has several bores 621 for water flowing therethrough. The board 62 is provided with a handrail 64 at a side facing the protective space 102 for user to hold it.

Figure 8:
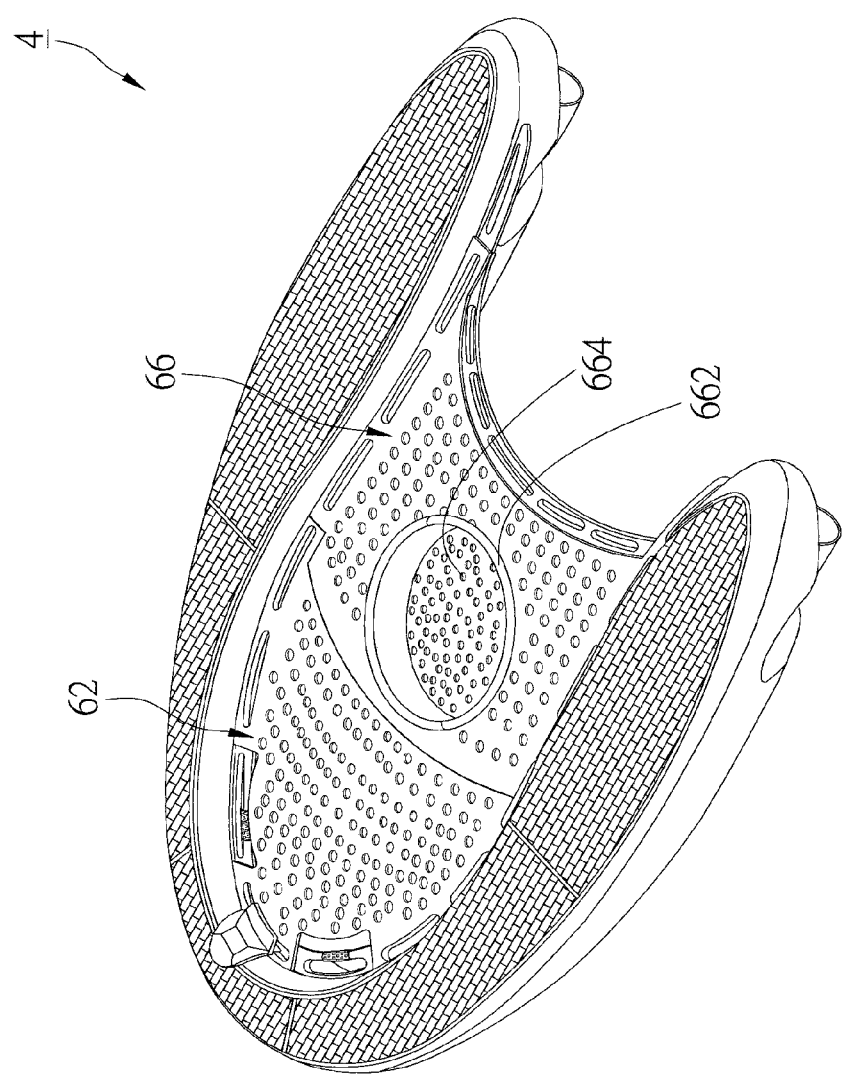
FIG. 8 is a perspective view of a fourth preferred embodiment of the present invention.

FIG. 8 shows a floating apparatus 4 of the fourth preferred embodiment of the present invention, which provides two boards 62, 66. The board 62 is the same as the third preferred embodiment, and the board 66 is in the protective space 102 also and is behind the board 62. The board 66 has a slot 662 and bores 664. Water may enter the slot 662 through the bores 664 for child to play in the slot 662.

Figure 9:
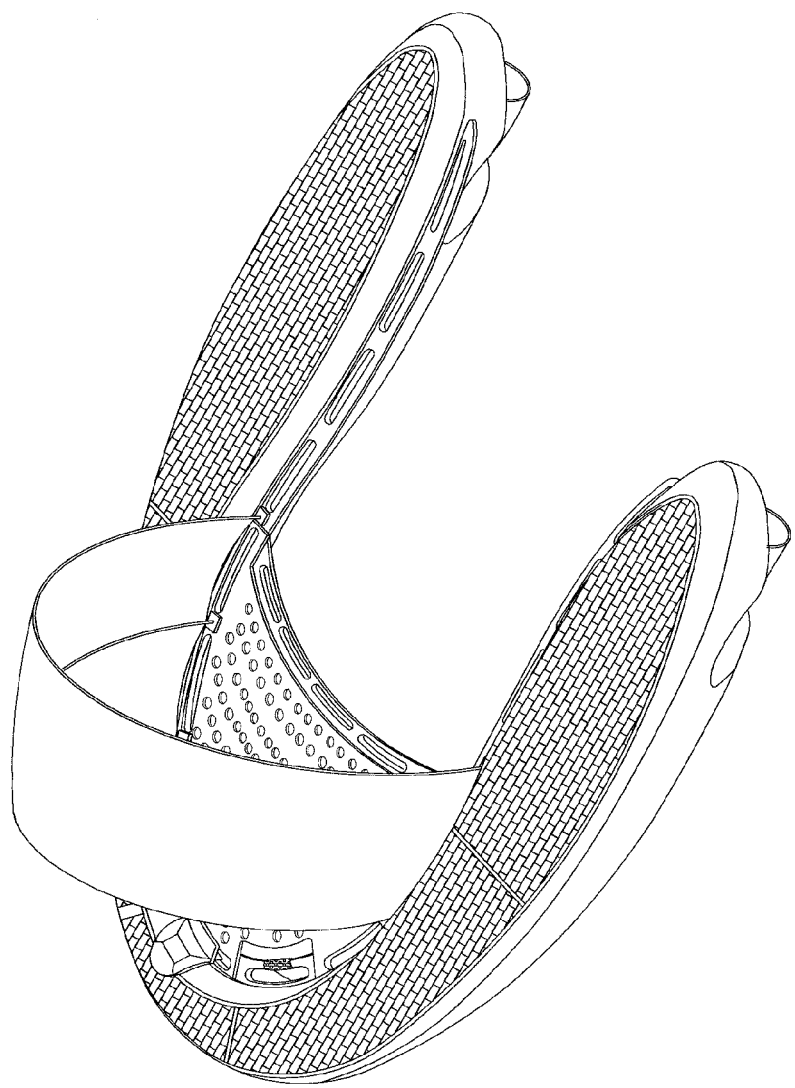
FIG. 9 is a perspective view the floating apparatus of the third preferred embodiment of the present invention with the shade.
Figure 10:
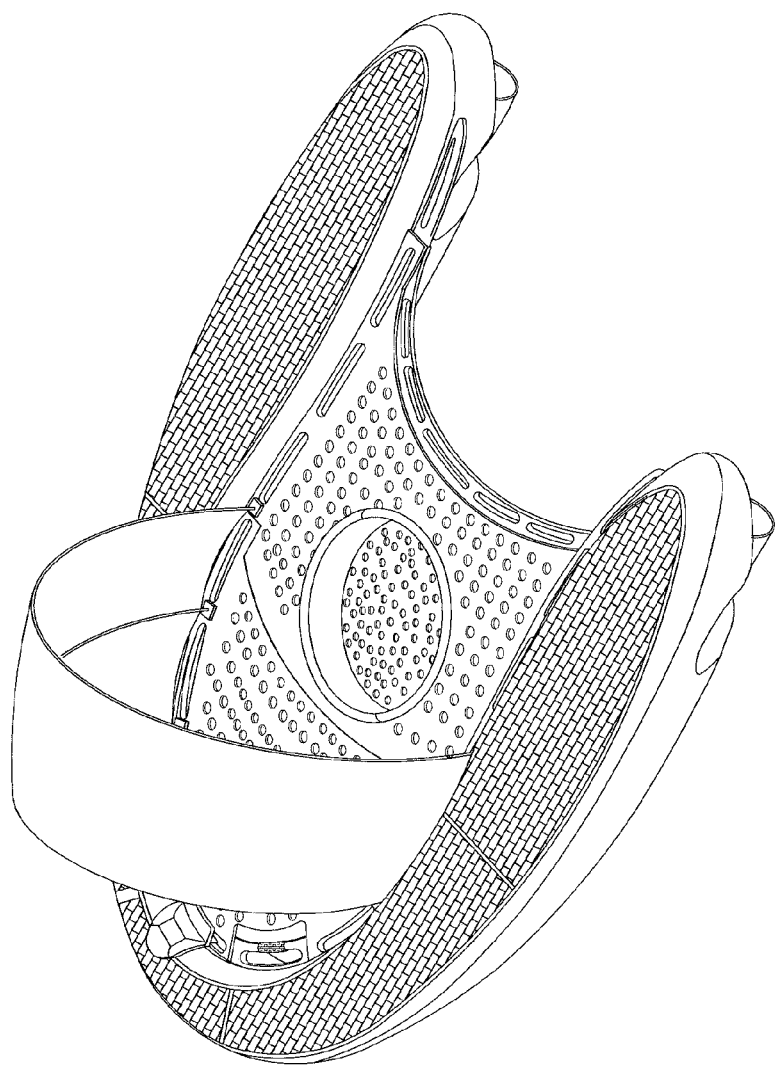
FIG. 10 is a perspective view the floating apparatus of the fourth preferred embodiment of the present invention with the shade.

FIG. 9 and FIG. 10 shows the shade is provided on the floating apparatus with one board or two boards.

Figure 11:
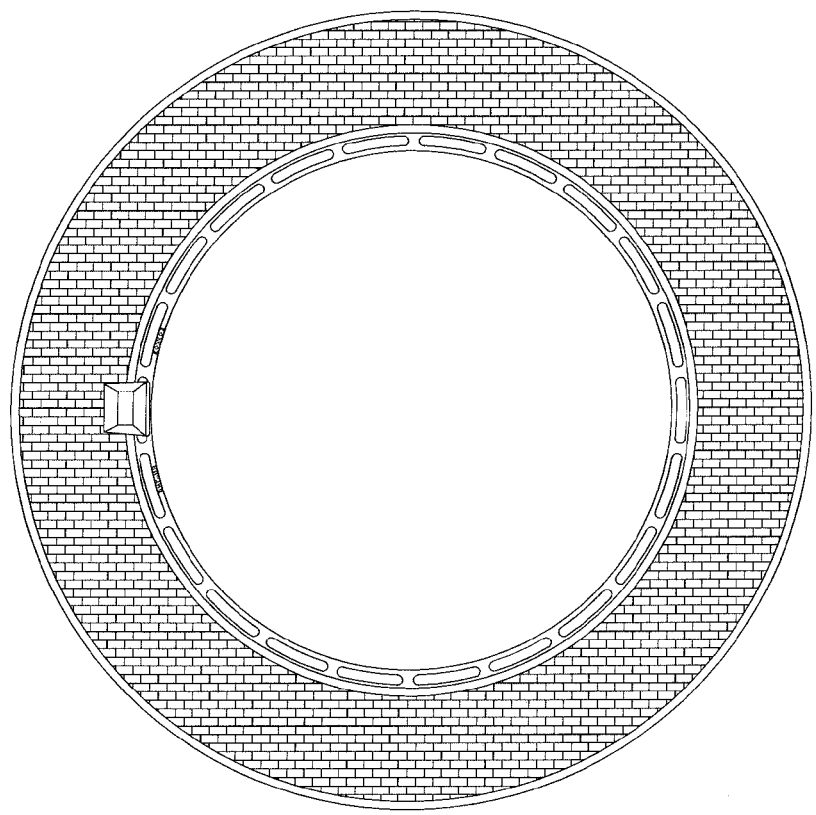
FIG. 11 is a top view of the present invention, showing the round floating device.
Figure 12:
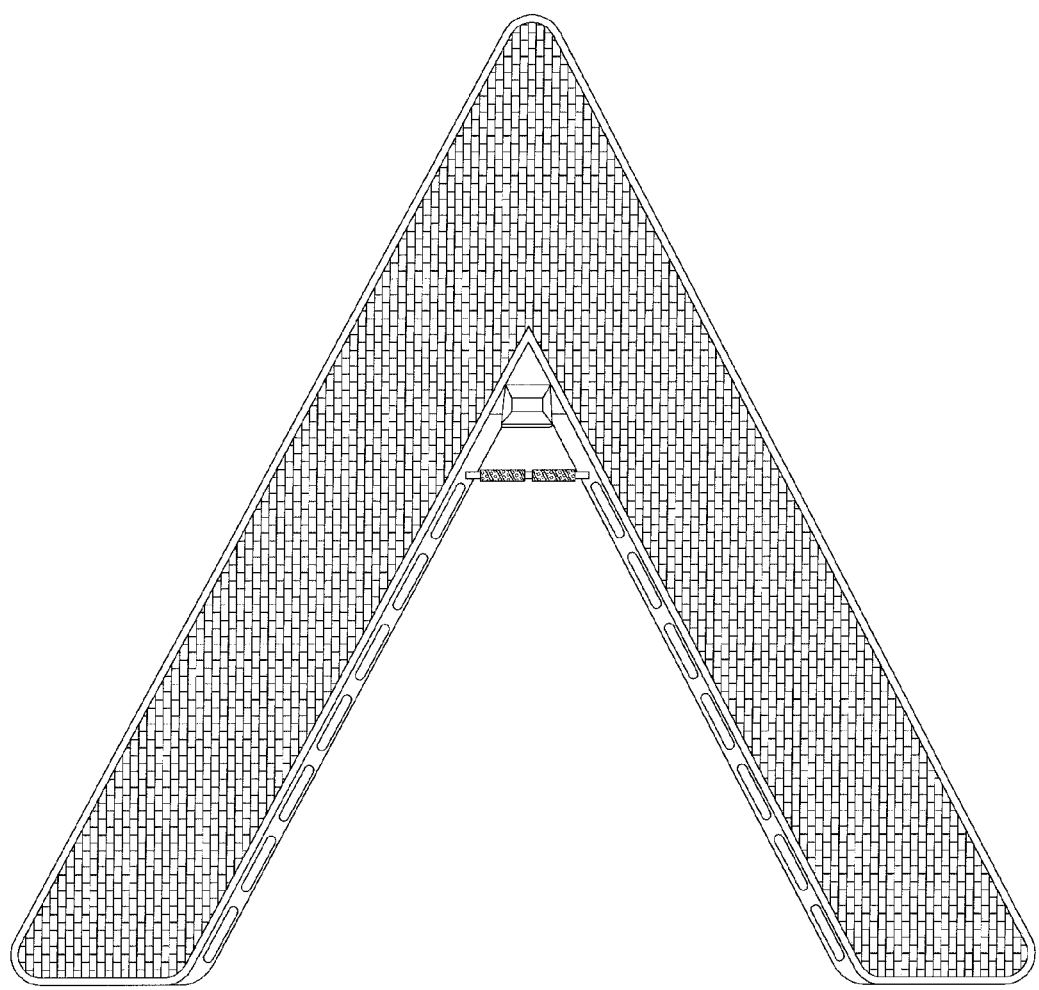
FIG. 12 is a top view of the present invention, showing the triangular floating device.
Figure 13:
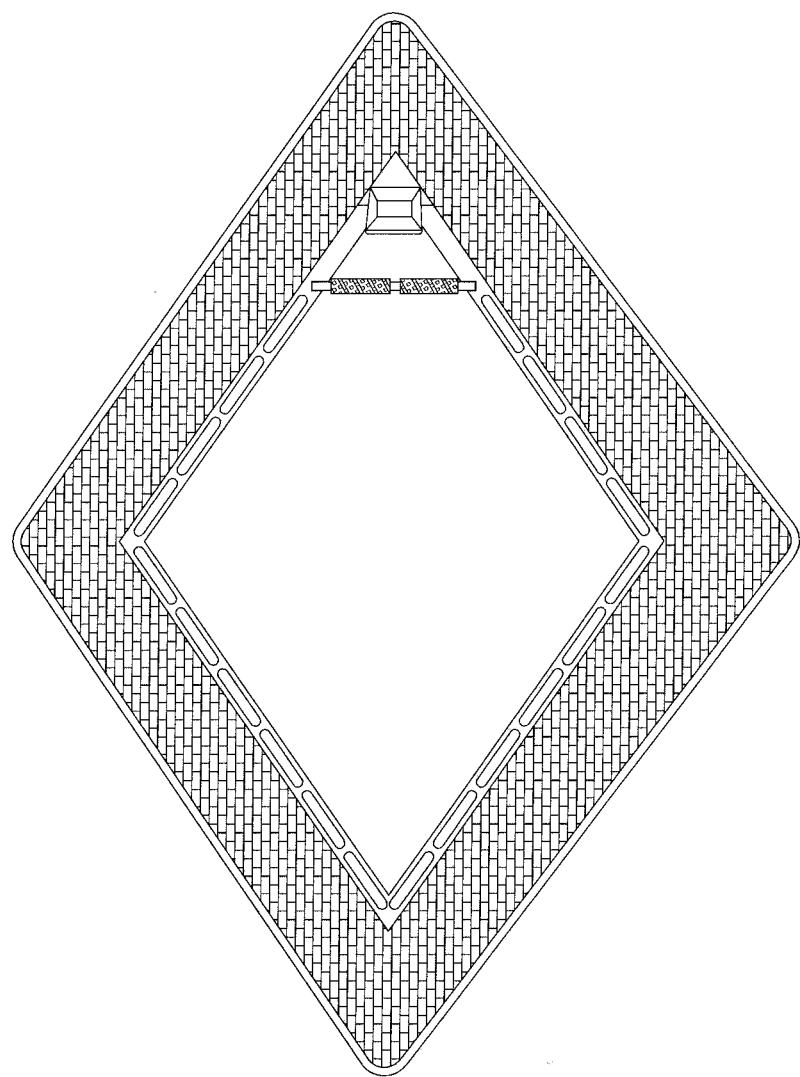
FIG. 13 is a top view of the present invention, showing the diamond-shaped floating device.

FIG. 11, FIG. 12 and FIG. 13 show various floating devices. It shows a round floating device in FIG. 11, a triangular floating device in FIG. 12, and a diamond-shaped floating device in FIG. 13. It is noted that all the floating devices respectively have a protective space for user to stay therein.

The user may take water activities with the floating apparatus of the present invention in a safe way. The floating apparatus of the present invention will not generate any pollution to save our planet.

The description above is a few preferred embodiments of the present invention, and the equivalence of the present invention is still in the scope of claim construction of the present invention.

What is claimed is:

1. A multifunctional floating apparatus, which is able to float on water for a single user to use, comprising:
    a floating device having an exterior edge and an interior edge, wherein the exterior edge is longer than the interior edge, and the floating device has an inner side at the interior edge;
    a handrail connected to the inner side of the floating device, wherein the handrail has at least a holding portion for a user to hold the handrail;
    a driving device, which is provided on the floating device to drive the floating device to sail on water;
    a controlling device, which is electrically connected to the driving device to control the driving device; and
    a battery set, which is disposed to the floating device to supply the driving device with electric power;
    wherein the floating device is a U-shaped member which forms a protective space at the inner side, the protective space allows a user to stay therein;
    wherein the driving device has two motors and two propellers which are respectively connected to one of the motors, and the controlling device has a controller electrically connected to the motors to control the motors;
    wherein the propellers are parallel and separated under water; the motors respectively drive the propellers to turn; and the controlling device controls both of the motors; and
    wherein the controlling device further has two handles on the handrail to be manipulated by a user and the controller controls the motors accordingly.

2. The multifunctional floating apparatus as defined in claim 1, wherein the handrail has at least an opening, and the holding portion is formed beside the opening.

3. The multifunctional floating apparatus as defined in claim 1, wherein the handrail has a plurality of openings, and the holding portion is formed beside each of the openings.

4. The multifunctional floating apparatus as defined in claim 1, further comprising at least a solar panel provided on the floating device and electrically connected to the battery set to convert light into electric power, and the electric power is stored in the battery set.

5. The multifunctional floating apparatus as defined in claim 1, wherein the driving device and the controlling device are electrically connected to the battery set to be driven with the electric power provided by the battery set.

6. The multifunctional floating apparatus as defined in claim 4, wherein the floating device has an up case and a low case connected together, and the solar panel is provided on the up case.

7. The multifunctional floating apparatus as defined in claim 6, further comprising a cover provided on the up case, wherein the cover is transparent and the solar panel is under the cover.

8. The multifunctional floating apparatus as defined in claim 1, further comprising two lids provided on the floating device, wherein the lids respectively surround the propellers.

9. The multifunctional floating apparatus as defined in claim 1, wherein the controlling device further has a global position system to receive a GPS (global position system) signal; and the controller controls the motors respectively according to the GPS signal.

10. The multifunctional floating apparatus as defined in claim 1, further comprising a shade, wherein the shade has opposite ends connected to the inner side of the floating device to form a shading area.

11. The multifunctional floating apparatus as defined in claim 1, further comprising a shade, wherein the shade has opposite ends connected to the handrail to form a shading area.

12. The multifunctional floating apparatus as defined in claim 1, further comprising a board connected to the floating device, wherein the board is in the protective space and fixed to the handrail for a user to rest thereon.

13. The multifunctional floating apparatus as defined in claim 12, wherein the board has a slot and a plurality of bores, wherein water flows through the bores, and the bores are on the bottom of the slot as well.

14. The multifunctional floating apparatus as defined in claim 12, wherein the board is provided with a handrail at the inner side for the user to hold.

15. The multifunctional floating apparatus as defined in claim 12, further comprising another board connected to the board, wherein both of the boards are in the protective space.

* * * * *